US007596438B2

(12) United States Patent
Chen et al.

(10) Patent No.: US 7,596,438 B2
(45) Date of Patent: Sep. 29, 2009

(54) BEACON-BASED TRAFFIC CONTROL SYSTEM

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

(*) Notice: Subject to any disclaimer, the term of this patent is extended or adjusted under 35 U.S.C. 154(b) by 783 days.

(21) Appl. No.: 11/336,913

(22) Filed: Jan. 23, 2006

(65) Prior Publication Data

US 2006/0178794 A1 Aug. 10, 2006

(30) Foreign Application Priority Data

Feb. 4, 2005 (TW) .............................. 94103799 A

(51) Int. Cl.
*G06F 7/00* (2006.01)

(52) U.S. Cl. ......................... 701/36; 244/189; 370/443; 455/435.2; 455/448

(58) Field of Classification Search ................... 701/36; 455/435.2, 448; 244/189; 370/443
See application file for complete search history.

(56) References Cited

U.S. PATENT DOCUMENTS 5,301,357 A * 4/1994 Thompson ............... 455/435.2
5,577,168 A * 11/1996 Haas et al. .................. 455/443
5,960,350 A * 9/1999 Schorman et al. ........... 455/450
6,647,328 B2 * 11/2003 Walker ........................ 701/36
6,965,816 B2 * 11/2005 Walker ........................ 701/16
7,047,009 B2 * 5/2006 Laroia et al. ................ 455/437
7,180,898 B2 * 2/2007 Yoshida et al. ........... 370/395.3
7,388,929 B2 * 6/2008 Roy ........................... 375/297
2004/0152464 A1 * 8/2004 Sugaya .................... 455/435.1
2004/0254690 A1 * 12/2004 Hasegawa et al. .............. 701/1

(Continued)

FOREIGN PATENT DOCUMENTS

JP 2001283373 A * 10/2001

(Continued)

OTHER PUBLICATIONS

GPS-free indoor location tracking in mobile ad hoc network (MANET) using RSSI; Ali, A.; Latiff, L.A.; Fisal, N.; RF and Microwave Conference, 2004. RFM 2004. Proceedings; Oct. 5-6, 2004 pp. 251-255; Digital Object Identifier 10.1109/RFM.2004.1411119.*

(Continued)

*Primary Examiner*—Cuong H Nguyen
(74) *Attorney, Agent, or Firm*—Bacon & Thomas, PLLC

(57) ABSTRACT

Disclosed is a beacon-based traffic control system installed in a motor vehicle for receiving a wireless signal from one of a plurality of beacons that arranged in multiple geographic locations, each beacon being defined to have a respective identification code, each beacon having a short-distance wireless transmitter for transmitting a wireless signal for receiving by the beacon-based traffic control system so that when the motor vehicle is moving to a different geographic location, the beacon-based traffic control system fetches the identification code from the wireless signal of the local beacon and searches the memory thereof to find a corresponding action command and then to execute the action command, controlling the operation of the electronic component of the motor vehicle subject to the action command.

14 Claims, 7 Drawing Sheets

U.S. PATENT DOCUMENTS

| | | | | |
|---|---|---|---|---|
| 2004/0267419 | A1* | 12/2004 | Jeng | 701/36 |
| 2006/0178794 | A1* | 8/2006 | Chen et al. | 701/36 |

FOREIGN PATENT DOCUMENTS

| | | | | |
|---|---|---|---|---|
| JP | 2005130069 | A | * | 5/2005 |
| JP | 2005309869 | A | * | 11/2005 |
| JP | 2006314093 | A | * | 11/2006 |
| JP | 2007028210 | A | * | 2/2007 |
| JP | 2007148793 | A | * | 6/2007 |
| JP | 2008070996 | A | * | 3/2008 |

OTHER PUBLICATIONS

Energy Efficient Inverse Power Control for a Cognitive Radio Link; Hoyhtya, Marko; Sahai, Anant; Cabric, Danijela; Mammela, Aarne; Cognitive Radio Oriented Wireless Networks and Communications, 2007. CrownCom 2007. 2nd International Conference on, Aug. 1-3, 2007 pp. 264 -271, Digital Object Identifier 10.1109/CROWNCOM.2007.4549808.*

3D electrode localization on wireless sensor networks for wearable BCI; Figueiredo, C. P.; Dias, N. S.; Hoffmann, K.-P.; Mendes, P. M.; Engineering in Medicine and Biology Society, 2008. EMBS 2008. 30th Annual International Conference of the IEEE; Aug. 20-25, 2008 pp. 2365-2368; Digital Object Identifier 10.1109/IEMBS.2008.4649674.*

Cloe: Cross-Layer Design for Wireless Networks; Hager, C.; Shyy, D.J.; Vehicular Technology Conference, 2007. VTC-2007 Fall. 2007 IEEE 66th; Sept. 30-Oct. 3, 2007 pp. 1583-1587; Digital Object Identifier 10.1109/VETECF.2007.336.*

Millimeter-wave propagation experiment in Madrid; Riera, Jose Manuel; Mostaza, Jose Manuel; Garcia, Pedro; Benarroch, Ana; Antennas and Propagation, 2006. EuCAP 2006. First European Conference on; Nov. 6-10, 2006 pp. 1-6 Digital Object Identifier 10.1109/EUCAP.2006.4584758.*

A very short distance dynamic diversity experiment; Machado, F.; Viler, E.; Fontan, F.P.; Antennas and Propagation, 2006. EuCAP 2006. First European Conference on; Nov. 6-10, 2006 pp. 1-6; Digital Object Identifier 10.1109/EUCAP.2006.4584897.*

Radio irregularity problem in wireless sensor networks: New experimental results; Ababneh, Nedal; Sarnoff Symposium, 2009. SARNOFF '09. IEEE; Mar. 30-Apr. 1 2009 pp. 1-5; Digital Object Identifier 10.1109/SARNOF.2009.4850343.*

Study on Network Architecture for Traffic Information Collection Systems Based on RFID Technology; Mijeom Kim; Jinsoo Park; Jaeyoung Oh; Hakjin Chong; Yoonkee Kim; Asia-Pacific Services Computing Conference, 2008. APSCC '08. IEEE Dec. 9-12, 2008 pp. 63-68; Digital Object Identifier 10.1109/APSCC.2008.170.*

Implementation of National Traffic Information Collection Systems in Ubiquitous Environments; Mijeom Kim; Jinsoo Park; Jaeyoung Oh; Hakjin Chong; Yoonkee Kim; Global Telecommunications Conference, 2008. IEEE GLOBECOM 2008. IEEE Nov. 30-Dec. 4, 2008 pp. 1-3; Digital Object Identifier 10.1109/GLOCOM.2008.ECP.1093.*

Power model for wireless body area network; Shih Heng Cheng; ChingYao Huang; Biomedical Circuits and Systems Conference, 2008. BioCAS 2008. IEEE Nov. 20-22, 2008 pp. 1-4; Digital Object Identifier 10.1109/BIOCAS.2008.4696859.*

Connectivity Aware Routing in Vehicular Networks; Qing Yang; Lim, A.; Agrawal, P.; Wireless Communications and Networking Conference, 2008. WCNC 2008. IEEE; Mar. 31-Apr. 3, 2008 pp. 2218-2223; Digital Object Identifier 10.1109/WCNC.2008.392.*

* cited by examiner

T

| identification code | control condition: time/date | control condition: speed | control condition: enable flag | control condition: .... | action command Q1,Q2, ..... | | |
|---|---|---|---|---|---|---|---|
| D01 | | | ENABLE | .... | Q1 | control the multimedia to play the landscape introduction film | .... |
| B07 | | | ENABLE | .... | Q2 | change the enable flag of B08 | .... |
| B08 | | | DISABLE | .... | Q3 | close the electric window and open the headlight | .... |
| *** | 17:00 PM ~ 08:00 AM | | ENABLE | .... | Q4 | open the headlight | .... |
| E07 | 11/1~11/15 10:00 AM~22:00 PM | | ENABLE | .... | Q5 | control the multimedia to play the promotional film | .... |
| A** | | 90km/hr | ENABLE | .... | Q6 | control the multimedia to play the over speed warning voice | .... |
| B14 | | | ENABLE | .... | Q7 | change the enable flag of A05 | .... |
| A05 | | | DISABLE | .... | Q8 | provide the present location of the vehicle to control center | .... |
| A13 | | | ENABLE | .... | Q9 | change the enable flag of E09 | .... |
| E09 | | | DISABLE | .... | Q10 | provide the present location of the vehicle to control center | .... |
| F01 | | | ENABLE | .... | Q11 | report the present location of the vehicle to control center | .... |
| F** | | 0km/hr | ENABLE | .... | Q12 | control the multimedia to play the warning voice of closing light and locking door | .... |

FIG.2

T

| identification code | control condition | | | | action command Q1,Q2, ..... | | |
|---|---|---|---|---|---|---|---|
| | time/date | speed | enable flag | .... | | | |
| D01 | | | ENABLE | .... | Q1 | control the multimedia to play the landscape introduction film | .... |
| B07 | | | ENABLE | .... | Q2 | change the enable flag of B08 | .... |
| B08 | | | DISABLE | .... | Q3 | close the electric window and open the headlight | .... |
| *** | 17:00 PM ~ 08:00 AM | | ENABLE | .... | Q4 | open the headlight | .... |
| E07 | 11/1~11/15 10:00 AM~22:00 PM | | ENABLE | .... | Q5 | control the multimedia to play the promotional film | .... |
| A** | | 90km/hr | ENABLE | .... | Q6 | control the multimedia to play the over speed warning voice | .... |
| B14 | | | ENABLE | .... | Q7 | change the enable flag of A05 | .... |
| A05 | | | DISABLE | .... | Q8 | provide the present location of the vehicle to control center | .... |
| A13 | | | ENABLE | .... | Q9 | change the enable flag of E09 | .... |
| E09 | | | DISABLE | .... | Q10 | provide the present location of the vehicle to control center | .... |
| F01 | | | ENABLE | .... | Q11 | report the present location of the vehicle to control center | .... |
| F** | | 0km/hr | ENABLE | .... .... | Q12 | control the multimedia to play the warning voice of closing light and locking door | .... |
| ZZZ | | | ENABLE | | Q13 | control the multimedia to play the voice of pulling over the vehicle | |

FIG.6

BEACON-BASED TRAFFIC CONTROL SYSTEM

BACKGROUND OF THE INVENTION

1. Field of the Invention

The present invention relates to a traffic control system and more particularly, to a beacon-based traffic control system.

2. Description of Related Art

A conventional traffic control system uses a GPS (Global Positioning System) to provide positioning service, a GPS auto track (the so-called GPS black box) to store multiple global positioning data or to help satellite navigation. Other on-board electronic devices such as LCD, multimedia system, and etc. may be used to provide electronic map, electronic paths, stock information, . . . and other services.

However, a GPS may be blocked and unable to receive satellite signal when the car is moving under an overhead bridge, in a tunnel, or within a high-rise building intensive area. In this case, it will be difficult to accurately calculate the location of the car, and the other devices of the car based on the GPS, for example, the navigation system will be unable to function. Therefore, the devices of the car based on the GPS can keep functioning only after the car has moved away from the blocked area and received the satellite signal again.

SUMMARY OF THE INVENTION

The beacon-based traffic control system of the present invention is installed in a motor vehicle for receiving a wireless signal from one of a plurality of beacons. The beacons are respectively arranged at a plurality of geographic locations. Each beacon is defined to have a respective identification code correspondingly. Each beacon comprises a short-distance wireless transmitter for transmitting the wireless signal reaching to a predetermined distance. The wireless signal contains the corresponding identification code of the respective beacon.

The beacon-based traffic control system comprises an on-board short-distance wireless receiver, a memory device, and a microprocessor. The on-board short-distance wireless receiver adapted to receive the wireless signal from one of the beacons to obtain the corresponding identification code of the respective beacon. The memory device having stored therein a comparison table, the comparison table comprising the identification codes of the beacons and a plurality of action commands, each the identification code corresponding to at least one of the action commands. The microprocessor electrically connected to the on-board short-distance wireless receiver and the memory device. The microprocessor adapted to fetch the corresponding identification code of the wireless signal received by the on-board short-distance wireless receiver, to search the corresponding at least one action command from the memory device subject to the fetched identification code, and execute the searched corresponding at least one action command so as to control the operation of the electronic devices of the motor vehicle.

The beacons can be classified in a plurality of geographic groups. The comparison table contains at least one of the geographic groups which corresponding to at least one of the identification codes of the beacons. The geographic groups can be a street group, a parking lot group, a tunnel group, a landscape group, and a shop group.

The geographic locations of the beacons can be in a sheltered geographic zone, for example, in a tunnel, high-rise building intensive district, underground parking lot, or any geographic area where signal interference or attenuation problem is serous.

Further, each identification code in the comparison table corresponds to a control condition, and the microprocessor is adapted to search the control condition corresponding to the fetched identification code and to execute the corresponding at least one action command after the searched control condition has been matched. The control condition includes control parameters such as Time/Date parameter, Speed parameter, Enable flag, or the like, and other Boolean expression combinations.

The at least one action command comprises an instruction to modify the content of the comparison table of the memory device, for example, the content can be the identification code, the action command, the control condition, and the related relation between the identification code, the action command, and the control condition.

The aforesaid electronic devices of the motor vehicle include the headlight system, electric windows, fog lights, car stereo system, AV multimedia system, wireless communication device, security system, on-board mobile secretary system, air conditioning system, navigation system, . . . etc.

The beacon-based traffic control system further comprises an input device for inputting data into the comparison table of the memory device and editing the data in the comparison table of the memory device. The input device can be a wireless receiver, CD-ROM, attached keyboard, mobile computer, . . . , etc.

The beacon-based traffic control system further comprises a control center electrically connected to the beacons by wire or wirelessly to provide to the motor vehicle a variety of services including fried matching, inquiry of sales centers, shopping in vehicle, inquiry of traffic conditions, . . . and etc.

BRIEF DESCRIPTION OF THE DRAWINGS

FIG. 2 is a schematic drawing of a comparison table stored in a memory according to the present invention.

FIG. 6 is a schematic drawing showing the comparison table updated according to the present invention.

DETAILED DESCRIPTION OF THE PREFERRED EMBODIMENT

Figure 1:
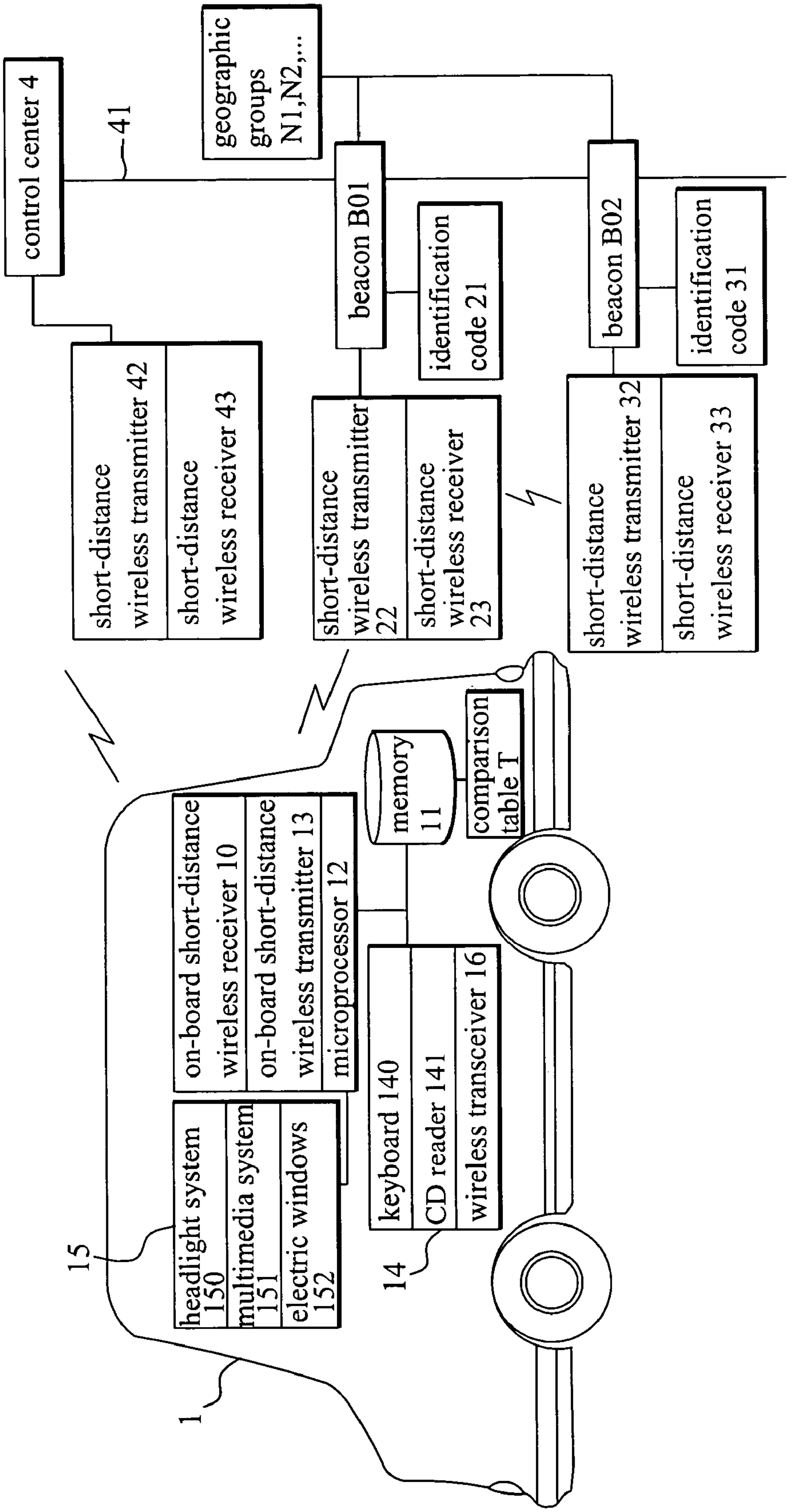
FIG. 1 is a schematic drawing showing a beacon-based traffic control system according to the present invention.

Referring to FIG. 1, a beacon-based traffic control system in accordance with the present invention is installed in a motor vehicle 1 for receiving a wireless signal from one of a plurality of beacons B01, B02, . . . F15. The beacons B01, B02 . . . are respectively arranged at different geographic locations, each being defined to have a respective identification code 21 correspondingly and each using a short-distance wireless transmitter 22 to transmit the wireless signal containing the corresponding identification code 21 reaching to a predetermined distance.

The motor vehicle 1 comprises an on-board short-distance wireless receiver 10, a memory 11, a microprocessor 12, an input device 14, and a variety of vehicle electronic components 15. The short-distance wireless receiver 10 can be a RFID (Radio Frequency Identification) receiver, bluetooth receiver, IEE802.11 series receiver, etc. for short distance application, capable of receiving the wireless signal transmitted by the short-distance wireless transmitter 22 of each beacon B01, B02, . . . .

The memory 11 has stored therein a comparison table T as shown in FIG. 2. As illustrated, the comparison table T contains the identification codes of the beacons B01, B02, . . . F15, control conditions of the corresponding Time/Data parameter, Speed parameter, and Enable flag parameter, and action commands Q1, Q2, . . . . Therefore, when the motor vehicle 1 entered the area within a predetermined distance around one of the beacons B01, B02, . . . F15, the on-board short-distance wireless receiver 10 receives the wireless signal from the respective beacon so as to obtain the respective identification code, for example, D01. The microprocessor 12 compares the identification code D01 to the comparison table T so as to find the corresponding action command Q1, and then controls the vehicle electronic components 15 to execute the obtained action command Q1, for example, controls the AV multimedia system 151 to play a local landscape introduction film, a video film, or a musical, the headlight system 150 to open or close, or the electric windows 152 to open or close.

Further, the input device 14 can be a keyboard 140, a CD reader 141, a wireless transceiver 16 (for example, mobile phone, PDA, pager, . . . ), card reader, etc. for inputting or editing the aforesaid comparison table T. By means of the wireless transceiver 16, the motor vehicle 1 can receive a variety of value-added services from a remote control center 4 through a wireless transmission.

Figure 3:
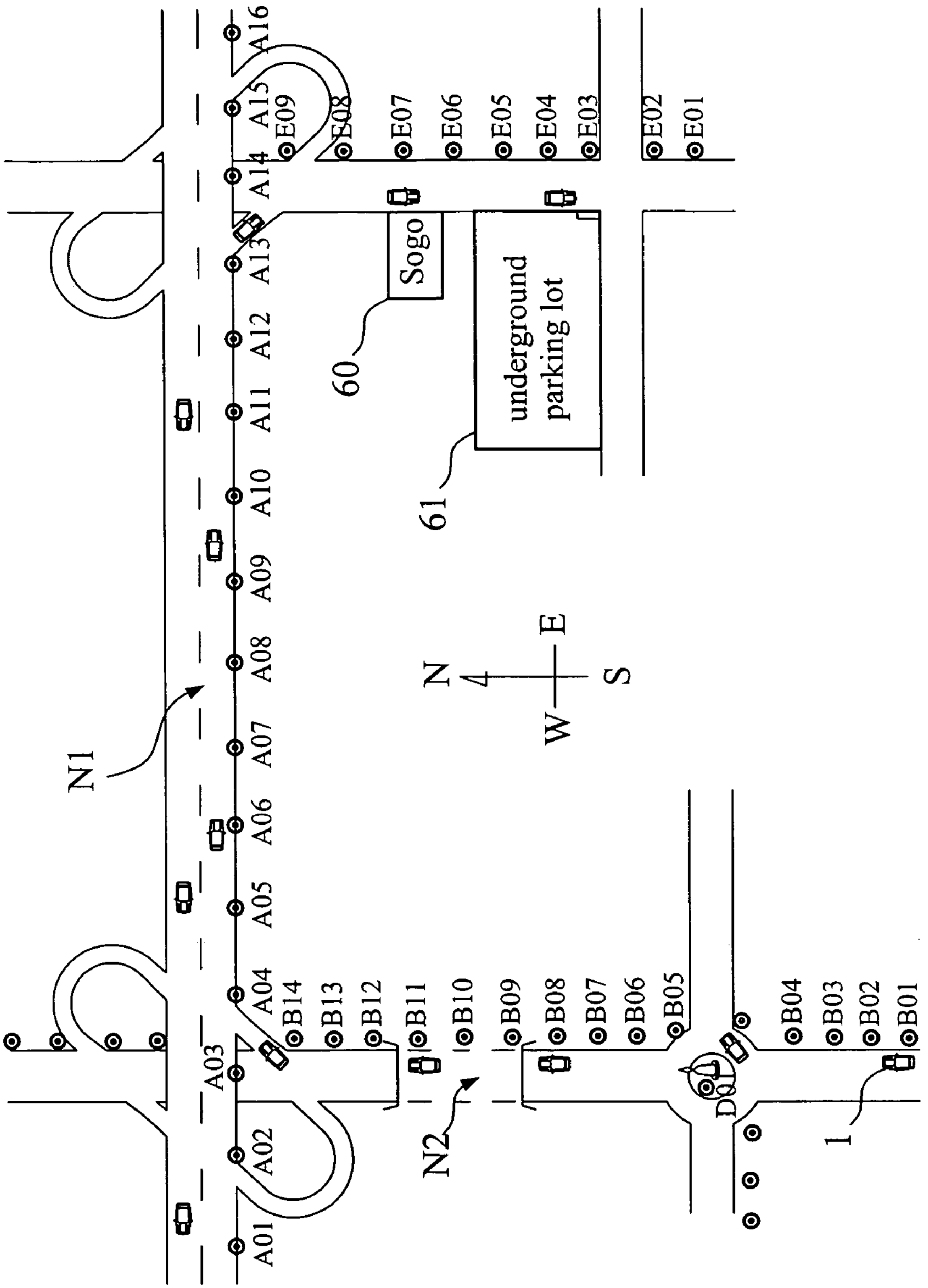
FIG. 3 is a schematic drawing of a geographic zone according to the present invention.

FIG. 3 is a schematic drawing showing one geographic zone according to the present invention. As illustrated, the aforesaid beacons B01, B02, . . . F15 are respectively located at different locations within the geographic zone. When the motor vehicle 1 is moving upwards (toward the north) from the lower left side shown in FIG. 3 through a beacon B01, the on-board short-distance wireless receiver 10 receives the wireless signal from the nearest beacon B01 to obtain the identification code 「B01」, and then compares the identification code 「B01」 to the comparison table T to find and execute the corresponding action command. The action command can be defined to do no work (i.e. execute the action "Null"). For example, when passing through the circle on the lower left side shown in FIG. 3, the on-board short-distance wireless receiver 10 of the motor vehicle 1 receives the wireless signal from the beacon D01 at the center of the circle, and the microprocessor 12 searches the comparison table T to find the action command Q1 corresponding to the identification code 「D01」 of the wireless signal from the beacon D01, and then executes the action command Q1 to drive the AV multimedia system 151 to play an introduction film that introduces the history of the sculptured statue at the center of the circle.

When the motor vehicle 1 keeps moving northwards through a beacon B07 toward the tunnel, the microprocessor 12 searches the comparison table T to find the action command Q2 and then executes the action command Q2. This action command Q2 is not to control the operation of the vehicle electronic components 15 but to modify the enable flag in the comparison table T corresponding to the identification code B08.

This enable flag works like a switch. When at 「disable」, the action command Q3 corresponding to the identification code of the beacon B08 will not be executed. When the motor vehicle 1 passes through the beacon B07, the enable flag corresponding to the identification code of the beacon B08 will be changed to 「enable」, and the microprocessor 12 will execute the action command Q3 to close the electric windows 152 and open the headlight system 150 when the motor vehicle 1 passes through the beacon B08 after the identification code of the beacon B08 has been changed to 「enable」. After the motor vehicle 1 passed through the beacon B08, the enable flag of the identification code of the beacon B08 is returned to 「disable」.

In the same way, when keeps moving northwards, the motor vehicle 1 will pass through a beacon B14 near the gateway before entering the highway, and will execute the corresponding action command Q7 searched from the comparison table T to change the enable flag of the identification code of the beacon A05 to 「enable」. When passing through the beacon A05 at the entry of the highway, the microprocessor 12 of the motor vehicle 1 will then execute the corresponding action command Q8 to provide the identification code of the beacon A05 and the license number of the motor vehicle 1 to the control center 4, allowing the control center 4 to know the location of the motor vehicle 1 and to trace the traveling of the motor vehicle 1.

When leaving the highway through an exit, the microprocessor 12 of the motor vehicle 1 will execute the action command Q9 of the identification code of the beacon A13 and the action command Q10 of the identification code of the beacon E09, providing the identification code of the beacon E09 and the license number of the motor vehicle 1 to the control center 4, so that the control center 4 can control the traffic flow on the highway, adjust the traffic flow control at the entry, or even calculate the feed to be charged to every motor vehicle passing through the entry or exit (beacon A04 or A13) of the highway.

As stated above, the action commands Q1, Q2 stored in the memory 11 corresponding to the identification codes of beacons B01, B02, . . . F15 can be triggered individually like a regular switch to control the operation of the electronic components 15 of the motor vehicle 1, or to provide data to the control center 4, enabling the control center 4 to know the moving direction of the motor vehicle 1.

Further, the identification codes in the comparison table T can be arranged and classified by group and the classified groups of identification codes can be corresponded to different geographic groups N1, N2, . . . , to facilitate project planning. For example, A indicates the area within A01~A16 as shown in FIG. 3, i.e., all the beacons along the highway group N1. The so-called different geographic groups N1, N2**, . . . means the plurality of beacons on the land are arranged in groups subject to the characteristics of their geographic environments, and the beacons within a same geographic environment are defined to be members of same group. For example, the beacons at a same street are defined to belong to same street group; the beacons at the streets around one parking lot are defined to belong to same parking lot group; the beacons in a tunnel are defined to belong to a same tunnel group; the beacons at a highway are defined to belong to a same highway group; the beacons in a business zone are defined to belong to a same business zone group; the beacons in an amusement park are defined to belong to a same amusement park group; and so on.

Therefore, the aforesaid grouping prototype facilitates establishment of the comparison table T and its effective application. Establishing the comparison table T by the aforesaid grouping prototype greatly reduces the amount of data and the size of the electronic file of the comparison table T, allowing fast renewal of the comparison table T during a repair work of the motor vehicle 1 at the motor vehicle shop or factory or update of the comparison table T by the control center 4 through the wireless transceiver 16 or by the CD reader 141.

Referring to FIG. 3 again, some of the identification codes of the beacons B01, B02, . . . F15 work subject to other control conditions, and the control conditions subject to the comparison table T include Time/Data parameter, Speed parameter, and Enable flag parameter. The control conditions may include other matters such as Altitude/Latitude parameter, Elevation parameter, Temperature parameter, . . . etc., or other Boolean expression combinations. According to the present preferred embodiment, the microprocessor 12 controls execution of the corresponding action command only after the control conditions have been checked to meet the requirements. For example, when the motor vehicle 1 passes through each beacon A during its movement on a highway, the speed of the motor vehicle 1 will be detected, and the identification code of the beacon A with Boolean logic 「and」 of Speed parameter will not be established if the speed of the motor vehicle 1 is below 90 km/hr when moving on a highway through the beacon A07, and therefore the action command Q6 will not be executed. However, if the speed of the motor vehicle 1 is over 90 km/hr when passing through the beacon A08, the microprocessor 12 will execute the action command Q6 to drive the multimedia system 151 to output a warning voice of speeding.

Other control conditions such as to execute the action command Q4 under the condition that the identification code grouping* to be any identification code and the Time/Date parameter to be 17:00PM~08:00AM. In this case, the microprocessor 12 will detect the current time when passing through any beacon B01 and will open the headlight system 150 if the current time is detected to be 17:01PM. Further, there is another condition with date included, for example, when the motor vehicle 1 passing through the beacon E07 near Sogo Department Store 60, the microprocessor 12 will detect the current time and date and will execute the action command Q5 to drive the multimedia system 151** to play Sogo Department Store Promotional Film if the date is detected to be within November $1^{st}$~$15^{th}$ and the time is detected to be within 10:00AM~22:00PM.

Further, in the aforesaid comparison table T, the control conditions (for example, Time/Date parameter, Speed parameter, Enable flag parameter, . . . etc.) corresponding to the identification codes of the beacons B01, B02, . . . F15, the corresponding action commands, and their related relationship are editable and renewable so that a specific effective comparison table T can be established to fit the requirements of every individual motor vehicle 1.

The effectiveness of the present invention will become more prominent in a sheltered area. As shown in FIG. 3, when the motor vehicle 1 entered the underground parking lot 61 in the City Hall, GPS satellite signal is blocked, and remote wireless communication systems such as GSM mobile telephones will produce a significant determination error on triangle positioning or signal strength positioning method due to Multipath Interference, Inter Symbol Interference, or Decay. At this time, the all over beacons of the present invention allow accurate positioning or can still provide services.

Figure 4:
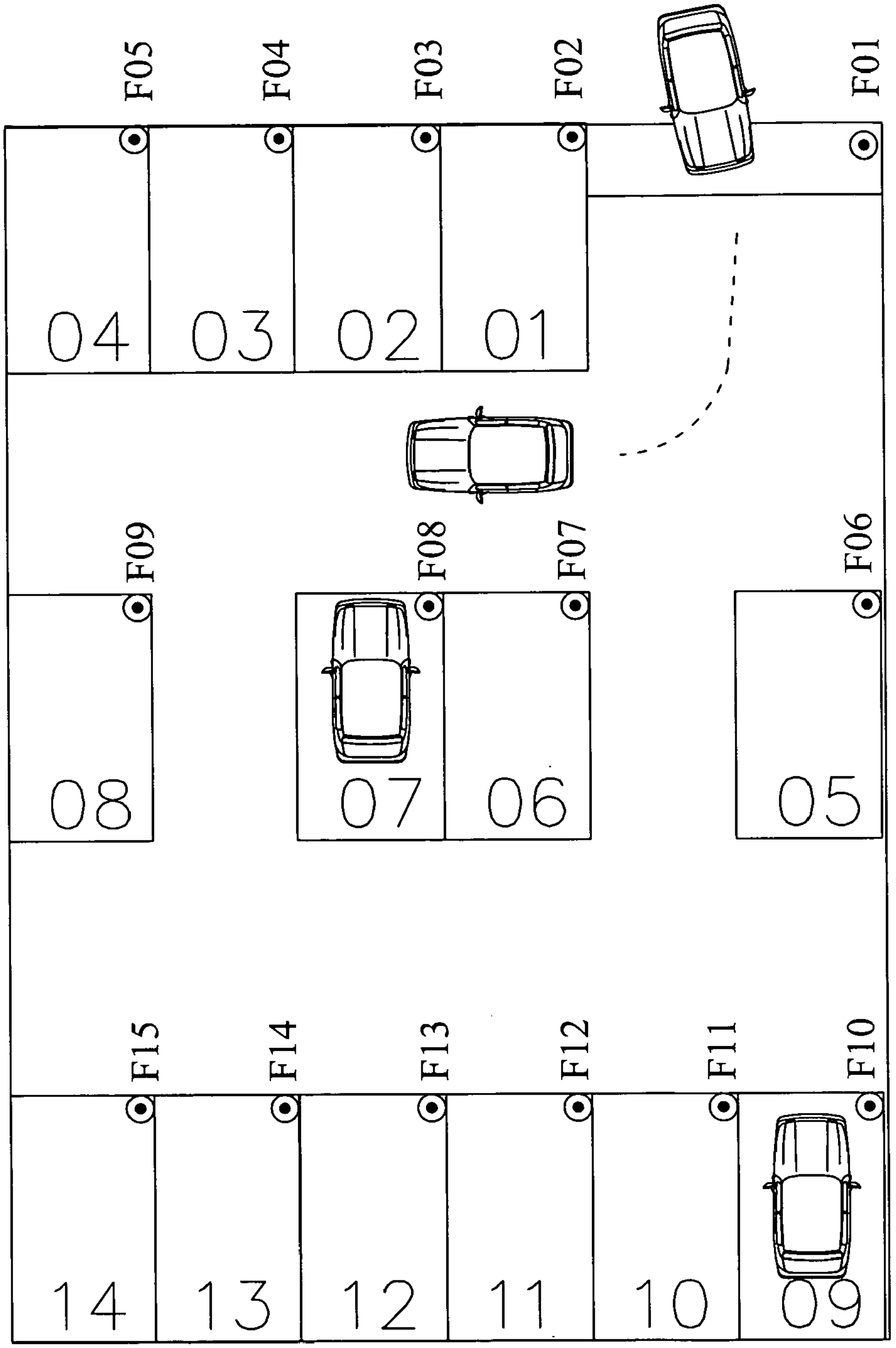
FIG. 4 is a plain view of an underground parking lot of the City Hall according to the present invention.

FIG. 4 is a plain view of the underground parking lot of the City Hall. As illustrated, when the motor vehicle 1 passing through the beacon F01 at the entrance, the microprocessor 12 of the motor vehicle 1 executes the corresponding action command Q11 to report to the control center 4. When leaving the parking lot and passing through the beacon F01, the microprocessor 12 of the motor vehicle 1 will report to the control center 4 again. Subject to the two reported data from the motor vehicle 1, the control center 4 can calculate the parking time of the motor vehicle 1 and the related parking fee. During parking of the motor vehicle 1, the motor vehicle 1 can also be controlled to drive multimedia system to play voices, advising the driver to turn off motor vehicle lights and locking motor vehicle doors (action command Q12). Furthermore, it can be known the remained parking space bye the beacons F02~F15.

Referring to FIG. 1 again, the aforesaid B01, B02, . . . F15 can be connected in series to the control center 4 by a signal line 41 several kilometers long. Alternatively, the control center 4 can use a short-distance wireless transmitter 42 and the short-distance wireless receiver 43 to achieve two-way communication with the short-distance wireless transmitters 22, 32 and wireless receivers 23, 33 of the beacons B01, B02, . . . F15. Therefore, the control center 4 can send data to the beacons B01, B02, . . . F15 by wire or wirelessly, enabling the data to be further sent to the motor vehicle 1 by the beacons B01, B02, . . . F15 to provide a variety of services, such as updating of the comparison table T, friend match, inquiry of sales centers, shopping in vehicle, inquiry of traffic conditions, . . . and etc.

Figure 5:
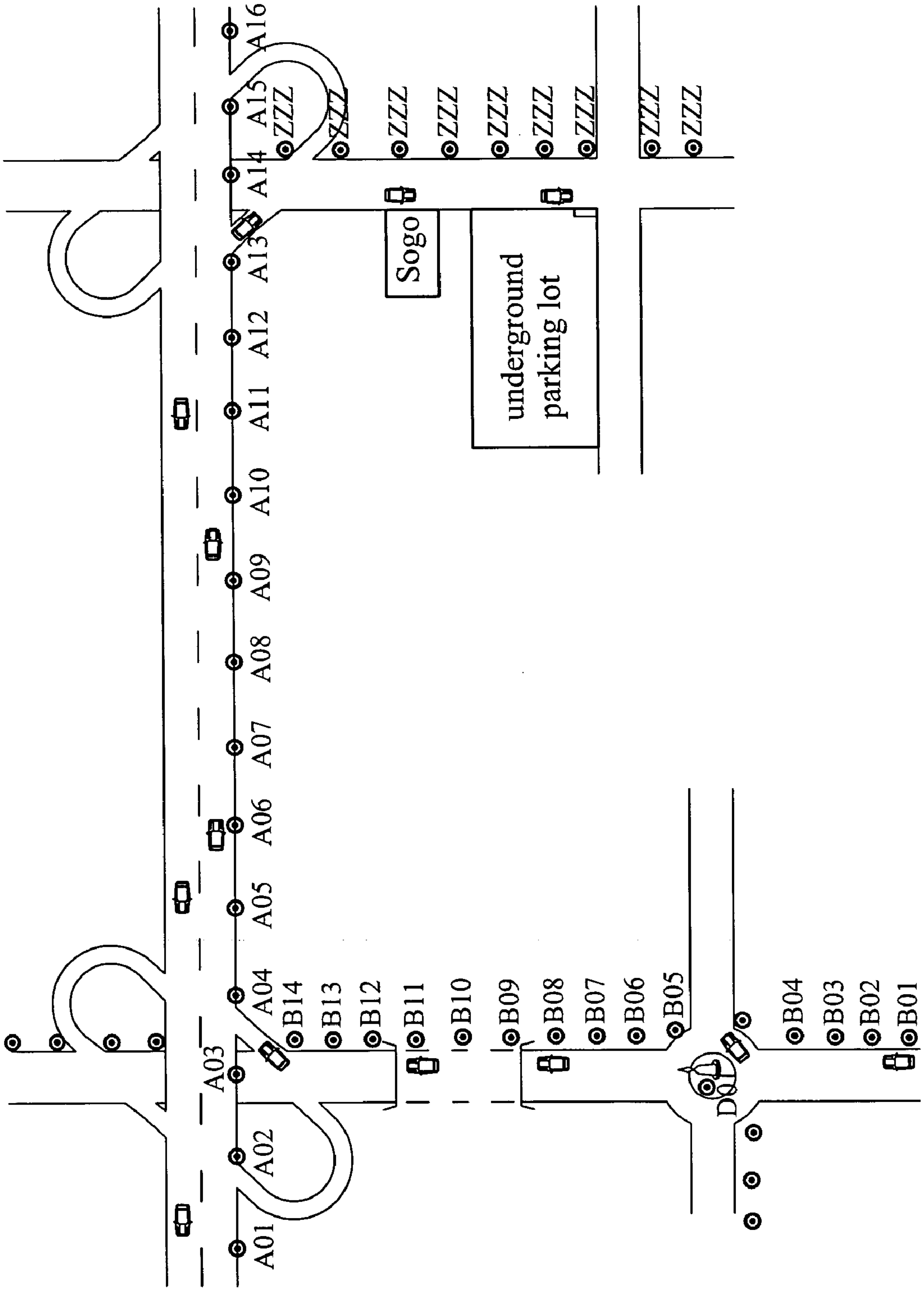
FIG. 5 is a schematic drawing of the geographic zone, showing the identification codes of the beacons modified according to the present invention.

Further, the control center 4 can provide the beacons B01, B02, . . . F15 with a new identification code. FIG. 5 is a schematic drawing of the geographic zone after modification of identification codes. FIG. 6 is a schematic drawing of the updated comparison table. If an ambulance (not shown) is going to pass through the road at the right side in FIG. 6 that extends from the south toward the north, the control center 4 can send a new comparison table T (with added identification code ZZZ and the related action command Q13) to the wireless receiver 16 of the motor vehicle 1 wirelessly, enabling the new comparison table T to be stored in the memory 11 by the microprocessor 12. Thereafter, the control center 4 changes the identification codes of the beacons E01~E09 at this specific road to become ZZZ. Thus, any motor vehicle 1 entering this road will execute the action command Q13 to drive the multimedia system 151 to play voices of pulling over the motor vehicle 1, advising the driver to move over to the side of the road for allowing the ambulance to pass.

Figure 7:
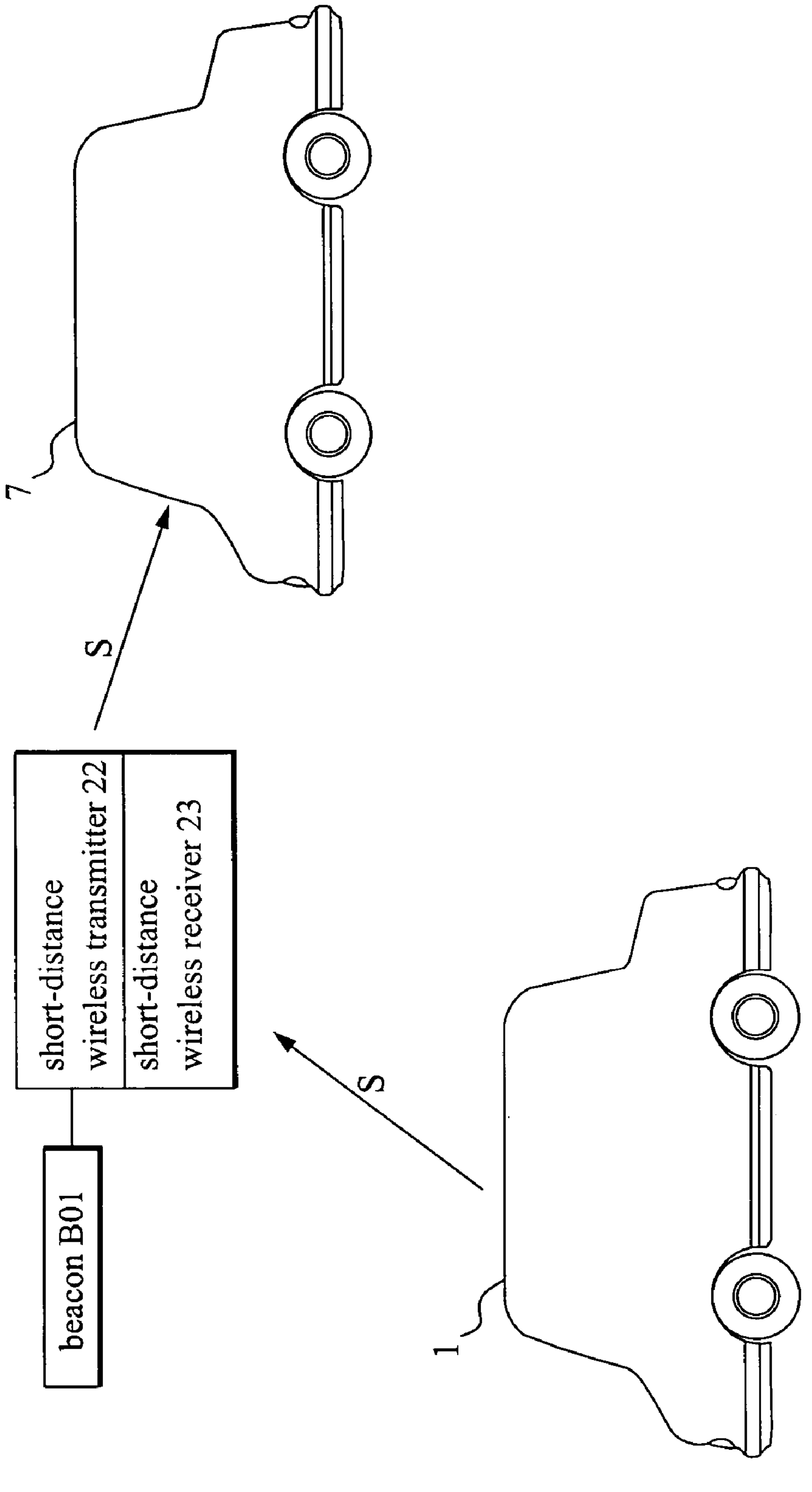
FIG. 7 is a schematic drawing of a friend matching system according to the present invention.

Further, because the beacon B01 is equipped with a short-distance wireless receiver 23 and the motor vehicle 1 has an on-board short-distance wireless transmitter 13, the beacon B01 can provide simple services to the motor vehicle 1 without the help of the control center 4. As illustrated in the friend matching system of FIG. 7, the driver of the motor vehicle 1 and the driver of the motor vehicle 7 have initiated the fried match service. At this time, the short-distance wireless receiver 23 of the beacon B01 receives the personal signal S from the motor vehicle 1, which personal signal S contains personal data including name, telephone number, sex, age, and etc, and then sends the received personal signal S to the other motor vehicle 7 through the short-distance wireless transmitter 22, enabling the driver of the motor vehicle 7 to make communication with the driver of the motor vehicle 1. Thus, the friend matching service is done.

Although the present invention has been explained in relation to its preferred embodiment, it is to be understood that many other possible modifications and variations can be made without departing from the scope of the invention as hereinafter claimed.

What is claimed is:

1. A beacon-based traffic control system installed in a motor vehicle for receiving a wireless signal from one of a plurality of beacons, said beacons being respectively arranged at a plurality of geographic locations, each said beacon being defined to have a respective identification code correspondingly, each said beacon comprising a short-distance wireless transmitter for transmitting the wireless signal reaching to a predetermined distance, said wireless signal containing the corresponding identification code of the respective beacon, the beacon-based traffic control system comprising:

an on-board short-distance wireless receiver adapted to receive the wireless signal from one of said beacons to obtain the corresponding identification code of the respective beacon;

a memory device, said memory device having stored therein a comparison table, said comparison table comprising the identification codes of said beacons and a plurality of action commands, each said identification code corresponding to at least one of said action commands; and a microprocessor electrically connected to said on-board short-distance wireless receiver and said memory device, said microprocessor adapted to fetch the corresponding identification code of the wireless signal received by said on-board short-distance wireless receiver, to search the corresponding at least one action command from said memory device subject to the fetched identification code, and execute the searched corresponding at least one action command.

2. The beacon-based traffic control system as claimed in claim 1, wherein said beacons are classified into a plurality of geographic groups; said comparison table contains at least one of said geographic groups which corresponding to at least one of the identification codes of said beacons.

3. The beacon-based traffic control system as claimed in claim 2, wherein said geographic groups being selected from one group of a street group, a parking lot group, a tunnel group, a landscape group, and a shop group.

4. The beacon-based traffic control system as claimed in claim 1, wherein said geographic locations of said beacons are in a sheltered geographic zone.

5. The beacon-based traffic control system as claimed in claim 1, wherein said at least one action command comprising an instruction to control at least one vehicle component to execute at least one operating action correspondingly.

6. The beacon-based traffic control system as claimed in claim 1, wherein each said identification code in said comparison table corresponds to a control condition; said microprocessor is adapted to search the control condition corresponding to the fetched identification code and to execute the corresponding at least one action command after the searched control condition has been matched.

7. The beacon-based traffic control system as claimed in claim 1, wherein said at least one action command comprising an instruction to modify the content of said comparison table of said memory device.

8. The beacon-based traffic control system as claimed in claim 1, further comprising an input device for inputting data into said comparison table of said memory device and editing the data in said comparison table of said memory device.

9. The beacon-based traffic control system as claimed in claim 1, further comprising an on-board short-distance wireless transmitter adapted to transmit a personal signal; at least one of said beacons has a short-distance wireless receiver adapted to receive the personal signal from said on-board short-distance wireless transmitter.

10. The beacon-based traffic control system as claimed in claim 9, wherein said personal signal contains a personal data.

11. The beacon-based traffic control system as claimed in claim 1, wherein said beacons each further comprise a short-distance wireless receiver for short-distance wireless mutual data transmission with other beacons.

12. The beacon-based traffic control system as claimed in claim 1, further comprising a control center for data transmission with at least one of said beacons.

13. The beacon-based traffic control system as claimed in claim 12, wherein said control center is capable of modifying the identification code of at least one of said beacons by wire/wirelessly.

14. The beacon-based traffic control system as claimed in claim 12, wherein said motor vehicle further comprises a wireless transceiver for data transmission with said control center wirelessly.

* * * * *

UNITED STATES PATENT AND TRADEMARK OFFICE

CERTIFICATE OF CORRECTION

PATENT NO. : 7,596,438 B2
APPLICATION NO. : 11/336913
DATED : September 29, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this

Twenty-eighth Day of September, 2010

David J. Kappos

*Director of the United States Patent and Trademark Office*